United States Patent [19]

Sherman et al.

[11] Patent Number: 4,887,217
[45] Date of Patent: Dec. 12, 1989

[54] PROCESS FOR MANUFACTURING PAINTS

[75] Inventors: Charles J. Sherman, Dyer; Kenneth S. Simone, Schererville, both of Ind.

[73] Assignee: The Sherwin-Williams Company, Cleveland, Ohio

[21] Appl. No.: 688,797

[22] Filed: Jan. 4, 1985

[51] Int. Cl.$^4$ .............................................. B01F 5/10
[52] U.S. Cl. .................................... 364/468; 364/502; 366/132; 366/152; 366/162; 366/142
[58] Field of Search ................ 364/468, 502; 366/132, 366/152, 162, 142

[56] References Cited

U.S. PATENT DOCUMENTS

| | | | |
|---|---|---|---|
| 2,540,797 | 2/1951 | Stearns | 235/61 |
| 2,542,564 | 2/1951 | Park | 235/61 |
| 2,923,438 | 6/1958 | Logan et al. | 222/2 |
| 3,020,795 | 2/1962 | McKinney et al. | 88/14 |
| 3,059,524 | 10/1962 | Grassmann et al. | 88/14 |
| 3,368,864 | 2/1968 | Gugerli | 8/25 |
| 3,601,589 | 8/1971 | McCarty | 364/502 |
| 3,605,775 | 11/1969 | Zaander et al. | 137/3 |
| 3,695,764 | 10/1972 | Delmas | 356/97 |
| 3,916,168 | 10/1975 | McCarty et al. | 364/526 |
| 4,008,829 | 2/1977 | Chandra et al. | 222/63 |
| 4,209,258 | 6/1980 | Oakes | 366/138 |
| 4,212,545 | 7/1980 | Lovasz et al. | 366/152 |
| 4,247,202 | 1/1981 | Failes | 356/310 |
| 4,272,824 | 6/1981 | Lewinger et al. | 364/502 |
| 4,403,866 | 9/1983 | Falcoff et al. | 366/132 |

FOREIGN PATENT DOCUMENTS 1589705  5/1981  United Kingdom .

OTHER PUBLICATIONS

Lih; Color Technology; 8-12-68; *Chemical Engineering;* pp. 146-156.
Ishak; The Fibre Optics Colorimeter and Its Applications in Paint Manufacture; 1971; *J. Oil Col. Chem. Assoc.;* pp. 129-140.
Rodrigues; Theory & Implementation of Modern Techniques of Color Conception, Matching and Control; Jul. 1977; *Fifth International Conference in Organic Coatings Science and Technology Proceedings* pp. 272-282.
Rodrigues; Color Vision and the Assessment of Color Diference in Instrumental Color Matching; 5-5-81; *Presented at the Detroit Paint Society "FOCUS" Conference* Johnston; Geometric Metamerism; May-Jun. 1967; Color Engineering; pp. 42-47 and 54.
Jenkins; Batch Color Correction by Tristimulus Colorimeter; 9-80; Modern Paint and Coatings; pp. 41-44.
Use of Instrumental Color Readings on Wet Films to Expedite Color Shading; vol. 48, No. 619, Aug. 1976; *Journal of Coatings Technology;* pp. 58-62.
Allen; Matrix Algebra for Colorimetrists; Jul.-Aug., 1966; *Color Engineering;* pp. 24-29.
Allen; Basic Equations Used in Computer Color Matching, II.; Jul., 1974; *J. Optical Society of America.*

Primary Examiner—John R. Lastova
Attorney, Agent, or Firm—Robert E. McDonald

[57] ABSTRACT

A process for shading paint to match the color of a standard paint which process involves the use of the determination of the theoretical dry color values of the paint being manufactured and the addition of the appropriate amounts of the components of the paint which must be added to provide a final dry color which falls within the prescribed color tolerance.

3 Claims, No Drawings

PROCESS FOR MANUFACTURING PAINTS

BACKGROUND OF THE INVENTION

1. Field of the Invention

This invention relates to a process for manufacturing paint that matches the color of a standard paint. The process involves the steps of (a) addition of the components used in the paint such as a polymeric binder for the paint, solvent for the paint, and colorant in the form of a dispersion or a solution, into a vessel having mixing means; and (b) shading the paint as it is being manufactured. Within the teaching of this invention, the process of shading the paint to match the standard color involves the use of a calculation to determine the theoretical dry color values of the paint being manufactured and to calculate the amount of the components of the paint which must be added to provide a final dry color which falls within the prescribed color tolerance.

2. Description of the Prior Art

Early devices such as those illustrated in Logan et al. U.S. Pat. No. 2,923,438 issued Feb. 2, 1960 provided a method for making paints according to a given formula but did not provide means for color matching the paint to a standard except for visual color matching using estimated additions of colorants to match a standard.

McCarty U.S. Pat. No. 3,601,589, issued Aug. 24, 1971, and McCarty et al. U.S. Pat. No. 3,916,168, issued Oct. 28, 1975, are directed toward computer controlled methods for preparing paints but use the standard procedure of spraying panels with paint, baking the panels and measuring color value of the panels and calculating and reshading the paint to bring the paint within acceptable color tolerance values.

British Pat. No. 1,589,705, published May 20, 1981, describes a general process for making a paint and adjusting the color values of the paint to come within the color tolerance values of a standard paint. However, this method directly utilizes light scattering and optical absorption properties of colorants used in the paints in combination with reflectance values of the paint at several wavelengths to determine the quantity of colorants required to bring the paint within an acceptable standard.

An article by Ishak in *J. Oil Col. Chem. Assoc.*, 1971, 54, 129–140 teaches the determination of the ratio of dry to wet tristimulus values but fails to teach the use of such a determination as a correction factor for in-process shading of wet paint to match a dry standard.

U.S. Pat. No. 4,403,866 teaches a computer controlled process for matching the color values of a standard liquid paint. This process fails to involve the use of a dry standard color and does not involve the use of correction factors to account for the color change of a wet paint when it dries.

Since the wet paint and a dry sample prepared from the wet paint exist in different areas of color space, utilizing the correction factor as taught herein to shade the wet paint to a theoretical dry color rather than to a wet standard provides a faster, more accurate, shading technique without requiring the production of a number of dry samples during the manufacturing process.

SUMMARY OF THE INVENTION

This invention relates to an improved method for shading paints to match the color values of a standard dry paint. In one particular embodiment, this invention utilizes a computer to facilitate the calculations. In another embodiment this invention provides a process for the computer controlled manufacture of a paint using the shading process of this invention.

In a process for the manufacture of paint to match the color or a standard paint within a specified color tolerance wherein the process involves the use of a spectrophotometer or a colorimeter and comprises:

(a) mixing in a vessel the components of a paint, said components comprising a liquid binder for the paint, solvent for the paint, and colorants for the paint; and (b) shading the paint during its manufacture by the addition of additional colorants in the form of dispersions or solutions to match the color of the specified standard paint within the given color tolerance, the improvement which comprises utilizing as the shading procedure a process which comprises:

(1) determining correction factors describing the relationship between the X, Y and Z tristimulus readings of wet paints and the corresponding X, Y and Z tristimulus values of dry paints prepared from said wet paints; and (2) measuring and determining by the spectrophotometer or colorimeter the X, Y and Z values of the wet paint being manufactured;

(3) calculating the theoretical X, Y and Z values of a dry paint sample of the paint being manufactured according to the formulas:

$$X_{(theoretical\ dry)} = \frac{X(\text{wet paint being manufactured})}{X \text{ correction factor}}$$

$$Y_{(theoretical\ dry)} = \frac{Y(\text{wet paint being manufactured})}{Y \text{ correction factor}}$$

$$Z_{(theoretical\ dry)} = \frac{Z(\text{wet paint being manufactured})}{Z \text{ correction factor}}$$

and (4) comparing the theoretical X, Y and Z dry valaues of the paint being manufactured to the X, Y and Z values of the standard dry paint and calculating the quantities of components to be added to the paint to bring the paint within the required color tolerance; and (5) adding to the paint being manufactured the quantities of components calculated in step (4); and (6) repeating steps (2) through (5) at least once in the event the paint is not within the specified color tolerance until the paint being manufactured is within said color tolerance.

A preferred application of the shading process of this invention utilizes a computer to perform the necessary calculations. In this case the shading process which constitutes the improvement taught in this invention comprises:

(1) providing the computer with
(a) formula of the paint;

(b) X, Y and Z tristimulus values of a standard dry paint;
(c) correction factors describing the relationship between the X, Y and Z tristimulus readings of wet paints and the corresponding X, Y and Z tristimulus values of dry paints prepared from said wet paints; and
(d) color tolerance value for the paint being manufactured;

(2) measuring and determining by the spectrophotometer or colorimeter the X, Y and Z values of the wet paint being manufactured;

(3) providing said measured X, Y and Z values of the wet paint being manufactured to the computer;

(4) calculating, by the computer, the theoretical X, Y and Z values of a dry paint sample of the paint being manufactured according to the formulas:

$$X_{(theoretical\ dry)} = \frac{X(\text{wet paint being manufactured})}{X \text{ correction factor}}$$

$$Y_{(theoretical\ dry)} = \frac{Y(\text{wet paint being manufactured})}{Y \text{ correction factor}}$$

$$Z_{(theoretical\ dry)} = \frac{Z(\text{wet paint being manufactured})}{Z \text{ correction factor}}$$

(5) comparing by the computer the theoretical X, Y and Z dry values of the paint being manufactured to the X, Y and Z values of the standard dry paint and calculating the quantities of components to be added to the paint to bring the paint within the required color tolerance; and (6) adding to the paint being manufactured the quantities of components calculated in step (5); and (7) repeating steps 2 through (6) at least once in the event the paint is not within the color tolerance values until the paint being manufactured is within said color tolerance.

One specific embodiment of the use of the shading process of this invention involves a fully automated computer controlled process for making a wet paint that upon drying will fall within the color tolerance of a standard dry paint. This process for manufacturing paint utilizes a computer electrically connected to a multiplicity of metering pumps, each pump being individually connected to a supply of a component used in the paint, said components used in the paint being liquid containing binder for the paint, solvent for the paint and colorant in the form of dispersions or solutions, a vessel having mixing means, a spectrophotometer or colorimeter having means to determine X, Y and Z tristimulus values of the wet paint in the vessel and being electrically connected to the computer, said process being controlled by the computer and comprising the following steps:

(1) providing the computer with
(a) formula of the paint,
(b) X, Y and Z tristimulus values of the standard dry paint,
(c) correction factors describing the relationship between the X, Y and Z tristimulus values of wet paints and the corresponding X, Y and Z tristimulus values of dry paints prepared from said wet paints; and
(d) color tolerance value for the paint being manufactured;

(2) metering exact amounts of components of the paint into the mixing vessel by the metering pumps which are being controlled by the computer;

(3) mixing said components to form a wet paint;

(4) measuring and determining by the spectrophotometer or colorimeter the X, Y and Z values of the wet paint being manufactured;

(5) providing said measured X, Y and Z values of the wet paint being manufactured to the computer;

(6) calculating by the computer the theoretical X, Y and Z values of a dry paint sample prepared from the paint components according to the formulas:

$$X_{(theoretical\ dry)} = \frac{X(\text{wet paint being manufactured})}{X \text{ correction factor}}$$

$$Y_{(theoretical\ dry)} = \frac{Y(\text{wet paint being manufactured})}{Y \text{ correction factor}}$$

$$Z_{(theoretical\ dry)} = \frac{Z(\text{wet paint being manufactured})}{Z \text{ correction factor}}$$

(7) comparing by the computer the theoretical X, Y, Z dry values of paint being manufactured to the X, Y and Z values of the standard dry paint and calculating the quantities of components to be added to the paint to bring the paint within the color tolerance; and (8) adding to the paint being manufactured the quantities of components calculated in step (7); and (9) repeating steps (2) - (8) at least once in the event the paint is not within the color tolerance value for the paint to bring the paint within said color tolerance.

DETAILED DESCRIPTION OF THE INVENTION

The process of this invention makes a paint having color values that accurately fall within the color tolerance of a standard dry paint by utilizing correction factors showing the relationship between the X, Y and Z readings of wet paints and the corresponding X, Y and Z readings of the same wet paints when dried. Utilizing these correction factors, one can calculate, during the manufacture of the paint, the theoretical X, Y and Z values of the wet paint being manufactured if it were allowed to dry. This process involves the use of a dry standard but requires only that color readings of the wet batch being manufactured be taken. Therefore, the process of this invention involves a wet-to-dry shading technique while the methods of the prior art typically involve either wet-to-wet or dry-to-dry processes.

In the preferred process of this invention a digital computer is used to facilitate the required calculations. Typical computers that can be used are the Digital Equipment Corporation DEC PRO 350 or DEC 2060. The spectrophotometer or colorimeter can be essentially any commercial unit capable of generating the X, Y and Z values of the wet paint being manufactured.

When the process of this invention involves the use of a computer, the formula of the paint which is being manufactured describing the amount of colorants, binder, solvents and other additives that are required to make a certain volume of a batch of wet paint will be fed into the computer. Additionally, the permissible color tolerance (i.e. the allowable variation from standard, typically called ΔE) for the paint being produced is also provided to the computer. The X, Y and Z tristimulus values of the standard dry paint to which the paint being manufactured is to be shaded are also fed into the computer. These X, Y and Z tristimulus values can be derived from the spectral curve measured by the spectrophotometer or can be read directly from a colorimeter. Correction factors describing the relationship between the X, Y and Z tristimulus readings of wet paints and the corresponding X, Y and Z tristimulus values of dry paints prepared from these wet paints are also fed into the computer. These correction factors should be based on paint samples prepared using the same formula as the one now being shaded. These correction factors are represented by the formulas:

$$X \text{ correction factor} = \frac{X \text{ wet sample}}{X \text{ dry sample}}$$

$$Y \text{ correction factor} = \frac{Y \text{ wet sample}}{Y \text{ dry sample}}$$

$$Z \text{ correction factor} = \frac{Z \text{ wet sample}}{Z \text{ dry sample}}$$

These correction factors can be conveniently based upon historical data such as could be obtained from retains of earlier production samples of the paint formula being produced. If more than one set of correction factors is generated, it is preferred to use the largest correction factor generated for each of X, Y and Z because this insures that the corresponding colorant addition will provide a color that remains on the lighter side of the color tolerance.

If there is no historical data which can be generated from retains of previous production batches, or which is already stored in the computer, the correction factors can be generated by measuring the X, Y and Z readings of the wet paint being produced and comparing that to the X, Y and Z readings of a dry sample prepared from that same paint.

Once the correction factors have been generated they help insure that although from that point on only measurements of the wet paint being produced are actually taken by the spectrophotometer or colorimeter, these wet paint readings can be corrected to show the theoretical dry X, Y and Z readings one would obtain by actually preparing and evaluating the corresponding dry paint.

The color technology used in the process is well known and is fully discussed in F. W. Billmeyer and M. Saltzman, *Principles of Color Technology*, John Wiley & Sons, New York, 2nd Edition, (1981). Other especially useful references include Wyszecki and Stiles, *Color Science*, Second Edition, John Wiley and Sons, New York (1982).

The spectrophotometer (or colorimeter) utilized in the practice of this invention is either positioned at a distance from the surface of the liquid paint corresponding to the focal point of the instrument, or it may utilize a remote sensor which can be immersed in the paint. The X, Y and Z values of the wet paint being manufactured as determined from the spectrophotometer are then provided to the computer. This information can be input manually, or the spectrophotometer can be electronically connected to the computer to provide direct transfer of the information.

The computer then calculates the theoretical X, Y and Z values predicted for a dry paint sample of the paint being manufactured according to the formulas:

$$X_{(theoretical\ dry)} = \frac{X(\text{wet paint being manufactured})}{X \text{ correction factor}}$$

$$Y_{(theoretical\ dry)} = \frac{Y(\text{wet paint being manufactured})}{Y \text{ correction factor}}$$

$$Z_{(theoretical\ dry)} = \frac{Z(\text{wet paint being manufactured})}{Z \text{ correction factor}}$$

The computer then compares the theoretical X, Y and Z dry readings of the paint being manufactured to the X, Y and Z values of the standard dry paint and calculates the quantities of components to be added to the paint to bring the paint within the color tolerance of the paint. The computer then calculates the amounts of solvents, binder solution and colorants to be added to bring a batch of paint within the desired tolerances and the additions may be made manually or automatically. After the addition of the prescribed quantities of components the X, Y and Z values of the wet paint and their corresponding theoretical dry values are again determined and if the theoretical dry color falls outside of the color tolerance value the process can be repeated to provide the next recommended addition of colorants.

The determination of X, Y and Z can be calculated from the spectral curve of the paint measured by the spectrophotometer as is well known in the art. The spectral curve is the plot of reflectance vs. wavelength and typically the spectrophotometer will determine the spectral curve of the paint through the visible light spectrum of 400-700 nanometers (nm) at 20 nm increments and calculate the X, Y and Z values for the paint based on this data according to the formulas:

$$X = \sum_{\lambda} ERx$$

$$Y = \sum_{\lambda} ERy$$

$$Z = \sum_{\lambda} ERz$$

where E is the relative energy of a standard light source, R is the reflectance of the object and $\bar{x}, \bar{y}, \bar{z}$ are the color mixture functions for a specified observer.

The amount of various colorants which must be added to shade the batch from its present theoretical dry X, Y and Z color readings to a color falling within the color tolerance value can be determined based on historical data of previous batches or can be determined by a series of mathematical calculations.

If the amount is determined based on historical calculations this can be conveniently accomplished by comparison of the present theoretical dry tristimulus values and previous batch production involving similar theoretical dry tristimulus values. By this method, a proportional amount of a colorant, based upon the historically required amount of colorant necessary to adjust from one set of tristimulus values to another, is added to the paint being shaded.

The mathematical procedures utilized to calculate the amount of colorant to be added based upon a difference in X, Y and Z readings are also well known in the art. A particularly useful procedure is that described in Eugene Allen's article in the *Journal of the Optical Society of America*, Volume 64, Number 7, July 1974 pages 991 to 993 the teaching of which is hereby incorporated by reference. For a colorant having a given concentration, absorption coefficient and scattering coefficient, this calculation provides a determination of the amount of said colorant which must be added to adjust the X, Y, Z readings from one value to another.

In the preferred application of this approach, the mathematical technique is first applied to the batch being manufactured to determine, by an iterative process, the quantities of colorants theoretically required to essentially match the X, Y and Z values for the batch being manufactured. In a second step the mathematical technique is again applied in an iterative process to determine the amount of colorants necessary to move from the color of the batch being produced to the desired color. In the process of this invention, the endpoint determination of each of the iterative steps is related to the difference between the theoretical dry values of X, Y and Z and the values of X, Y and Z which would be required to produce the spectral curve of the batch being manufactured.

The mathematical equations for this type of calculation (assuming four colorants charged into the paint being produced and subsequently shading with three of those colorants) are:

$$c = \text{pigment concentration vector} = \begin{bmatrix} c_1 \\ c_2 \\ c_3 \end{bmatrix}$$

$$= (TE\{D_k \Phi_k - k^{(4)} u] + D_s[\Phi_s - s^{(4)} u]\})^{-1} \cdot TE\{D_k[k^{(a)} - k^{(4)}] + D_s[s^{(a)} - s^{(4)}]\}$$

where $$T = \begin{bmatrix} X_{400} & X_{420} & \ldots & X_{700} \\ Y_{400} & Y_{420} & \ldots & Y_{700} \\ Z_{400} & Z_{420} & \ldots & Z_{700} \end{bmatrix} = \begin{array}{l} \text{color mixture function for a specified observer} \\ \text{(available from published references)} \end{array}$$

$$E = \begin{bmatrix} E_{400} & 0 & \ldots & 0 \\ 0 & E_{420} & \ldots & 0 \\ \ldots & \ldots & \ldots & \ldots \\ 0 & 0 & \ldots & E_{700} \end{bmatrix} = \begin{array}{l} \text{relative spectral energy distribution of a specified light source} \\ \text{(available from published references)} \end{array}$$

$$D_k = \begin{bmatrix} \left(\frac{\partial R}{\partial K}\right)_{400} & 0 & \ldots & 0 \\ 0 & \left(\frac{\partial R}{\partial K}\right)_{420} & \ldots & 0 \\ \ldots & \ldots & \ldots & \ldots \\ 0 & 0 & \ldots & \left(\frac{\partial R}{\partial K}\right)_{700} \end{bmatrix} = \begin{array}{l} \text{matrix describing partial derivative of reflectance} \\ \text{with respect to absorbance at each wavelength} \end{array}$$

where $\left(\frac{\partial R}{\partial K}\right)_i = -2R_i^2/[S_i(1 - R_i^2)]$ $R_i$ = reflectance of color at $i$ $S_i$ = scattering of color at $i$ $$D_s = \begin{bmatrix} \left(\frac{\partial R}{\partial S}\right)_{400} & 0 & \ldots & 0 \\ 0 & \left(\frac{\partial R}{\partial S}\right)_{420} & \ldots & 0 \\ \ldots & \ldots & \ldots & \ldots \\ 0 & 0 & \ldots & \left(\frac{\partial R}{\partial S}\right)_{700} \end{bmatrix}$$ = matrix describing partial derivative of reflectance with respect to scattering at each wavelength where $\left(\frac{\partial R}{\partial S}\right)_i = R_i[1 - R_i]/[S_i(1 + R_i)]$ $$\Phi_k = \begin{bmatrix} K^{(1)}_{400} & K^{(2)}_{400} & K^{(3)}_{400} \\ K^{(1)}_{420} & K^{(2)}_{420} & K^{(3)}_{420} \\ \ldots & \ldots & \ldots \\ K^{(1)}_{700} & K^{(2)}_{700} & K^{(3)}_{700} \end{bmatrix}$$ = absorption coefficient of the three colorants calculated based upon experimental spectral photometric measurements $$\Phi_s = \begin{bmatrix} S^{(1)}_{400} & S^{(2)}_{400} & S^{(3)}_{400} \\ S^{(1)}_{420} & S^{(2)}_{420} & S^{(3)}_{420} \\ \ldots & \ldots & \ldots \\ S^{(1)}_{700} & S^{(2)}_{700} & S^{(3)}_{700} \end{bmatrix}$$ = scattering coefficient of the three colorants calculated based upon experimental spectral photometric measurements $$k^{(4)} = \begin{bmatrix} K^{(4)}_{400} \\ K^{(4)}_{420} \\ \cdot \\ \cdot \\ K^{(4)}_{700} \end{bmatrix} \quad s^{(4)} = \begin{bmatrix} S^{(4)}_{400} \\ S^{(4)}_{420} \\ \cdot \\ \cdot \\ S^{(4)}_{700} \end{bmatrix} \quad u = [1\ 1\ 1]$$

where $S_i^{(a)} = \Phi_s c + s^{(4)}(1 - C_1 - C_2 - C_3)$ $K_i^{(a)} = S_i^{(a)}(1 - R_i)^2/2R_i$ $\Delta c = (TE\{D_k[\Phi_k - k^{(4)}u] + D_s[\Phi_s - s^{(4)}u]\})^{-1}\Delta t$ where $\Delta t$ is a vector $$\begin{bmatrix} \Delta X \\ \Delta Y \\ \Delta Z \end{bmatrix}$$

representing the difference between the theoretical dry X, Y and Z values and the values of X, Y and Z which would be required to produce the spectral curve of the batch being manufactured.

$$R_i^{(a)} = \frac{1}{1 + \left(\frac{K_i^{(a)}}{S_i^{(a)}}\right) + \sqrt{\left(\frac{K_i^{(a)2}}{S_i^{(a)2}}\right) + 2\left(\frac{K_i^{(a)}}{S_i^{(a)}}\right)}}$$

These equations are conveniently utilized in the following manner:

A. As a first step, a rough color match of the batch being produced is calculated, then an iterative calculation corrects the rough match to correspond to the theoretical dry batch colors by:
 (1) Forming matrices T, E, u, $\phi_k$, $\phi_s$, k(4) and s(4);
 (2) Calculate a rough match to the theoretical dry batch by calculating $K_i^{(a)}$ and $S_i^{(a)}$ from the paint formula;
 (3) Utilize these $K_i^{(a)}$ and $S_i^{(a)}$ values to calculate $R_i^{(a)}$;
 (4) Utilizing these values calculate the c matrix;
 (5) Calculate $\Delta E$ according to the Friele-MacAdam-Chickering color difference equation:

$\Delta E = [(\Delta C_{FMC})^2 + \Delta L^2]^{\frac{1}{2}}$ where:

$$\Delta C_{FMC} = K_1 \Delta C_1, \text{ and } \Delta L = K_2 \Delta L_2,$$

$$\Delta C_1 = [(\Delta C_{rg}/a)^2 + (\Delta C_{yb}/b)^2]^{1/2}$$

$$\Delta L_1 = (P\Delta P + Q\Delta Q)/(P^2 + Q^2)^{1/2}$$

$$\Delta C_{rg} = (Q\Delta P - P\Delta Q)/(P^2 + Q^2)^{1/2}$$

$$\Delta C_{yb} = S\Delta L_1/(P^2 + Q^2)^{1/2} - \Delta S$$

$$\Delta L_2 = 0.279 \Delta L_1/a$$

$$K_1 = 0.55669 + 0.049434Y - 0.82575 \cdot 10^{-3}Y^2 + 0.79172 \cdot 10^{-5}Y^3 - 0.30087 \cdot 10^{-7}Y^4,$$

$$K_2 = 0.17548 + 0.027556Y - 0.57262 \cdot 10^{-3}Y^2 + 0.63893 \cdot 10^{-5}Y^3 - 0.26731 \cdot 10^{-7}Y^4,$$

$$a^2 = 17.3 \cdot 10^{-6}(P^2 + Q^2)/[1 + (2.73P^2Q^2)(P^4 + Q^4)],$$

$$b^2 = 3.098 \cdot 10^{-4}(S^2 + 0.2015Y^2)$$

$$P = 0.724\,X + 0.382\,Y - 0.098\,Z,$$
$$Q = -0.48\,X + 1.37\,Y + 0.1276\,Z,$$
$$S = 0.686\,Z$$

where
$$\Delta P = 0.724(X_{rm} - X_{dt}) + 0.382(Y_{rm} - Y_{dt}) - 0.098(Z_{rm} - Z_{dt})$$

$$\Delta Q = -0.48(X_{rm} - X_{dt}) + 0.382(Y_{rm} - Y_{dt}) + 0.1276(Z_{rm} - Z_{dt})$$

$$\Delta S = 0.686(Z_{rm} - Z_{dt})$$

where the subscript rm identifies the tristimulus readings of the rough match and the subscript dt identifies the dry theoretical tristimulus readings.

(6) If $\Delta E$ is sufficiently small, e.g. $\leq 0.1$, no further iteration is necessary. If not, then iterate by generating the new values of $K_i, S_i$ and $R_i$ and calculate the tristimulus values of this new match $t = TER$ and again calculate $\Delta E$. This process can be repeated until $\Delta E$ is sufficiently small.

(7) The rough match generated in steps (1)–(6) correlates the calculated color of the batch being manufactured versus the theoretical dry tristimulus values. This is then iterated further to provide a closer match to the theoretical dry values by calculating a new $D_k$ and $D_s$ matrix from the newly generated values of $K_i S_i$ and $R_i$. The new $D_s$ and $D_k$ matrices generate a new matrix to be inverted for the $\Delta C$ calculation. The new C matrix is calculated and corrected by the $\Delta C$ matrix so that $C_{new} = C_{old} + \Delta C$. These iterations can be repeated until $\Delta E$ is sufficiently small.

B. The steps of (1)–(7) can then be repeated to determine the amount of colorants necessary to adjust the color from that of the theoretical dry batch to the standard batch except that the fourth colorant will now be the final match to the theoretical dry batch obtained from the iteration steps (1)–(7). The final C matrix can be converted to the volume and weight of colorant which must be added by:

$$\frac{\text{current pigment volume in batch now}}{1 - C_1 - C_2 - C_3} \times C = $$

pigment volume to add and $$100 \times \frac{\text{weight per gallon of colorant}}{\% \text{ concentration of pigment in colorant}} \times C_i = $$

weight of each colorant $i$ to add

After the paint is prepared to meet the required color tolerance it can be filled into suitable containers either automatically or manually by using conventional filling equipment and procedures. Additionally, other instruments can be included in this process which measures properties such as the hiding power of the paint, the viscosity and density of the paint. The data generated by these instruments may also be fed to the computer and calculations made so that additions of binder solutions, solvents and colorants can be adjusted to bring the paint within tolerances for the above properties as well.

If desired, the entire paint manufacturing process, or any combination of individual steps of the manufacturing process can be controlled by a computer. If the computer is electronically connected to metering pumps which control the supply of a component used in the paint and is electronically connected to the spectrophotometer the computer can initiate the addition of accurately measured amounts of each component based upon the spectrophotometric readings and calculations of the computer.

Although it is less convenient to do so, any of the clculations required herein can be done without the aid of the computer simply by utilizing the proper mathematical formulations.

The following example has been selected to illustrate specific embodiments and practices of advantage to a more complete understanding of the invention.

EXAMPLE I

A microcomputer was electronically connected to a spectrophotometer which was positioned to determine the color readings of a wet batch being manufactured.

A castor oil alkyd tan colored paint was formulated and the following correction values based on historical data of earlier batches of this paint were supplied to the computer:

X correction factor = 1.0638
Y correction factor = 1.0626
Z correction factor = 1.0024

The following spectral curve values of the standard paint were supplied to the computer:

| Wavelength | Reflectance |
|---|---|
| 400 | 22.16 |
| 420 | 28.73 |
| 440 | 31.76 |
| 460 | 33.53 |
| 480 | 34.03 |
| 500 | 35.36 |
| 520 | 38.62 |
| 540 | 41.09 |
| 560 | 43.18 |
| 580 | 43.95 |
| 600 | 43.82 |
| 620 | 43.34 |
| 640 | 42.67 |
| 660 | 42.16 |
| 680 | 41.32 |

| Wavelength | Reflectance |
| --- | --- |
| 700 | 40.97 |

The following X, Y, Z values of the standard paint were calculated by the computer based on that spectral curve:

X standard dry = 40.15
Y standard dry = 41.35
Z standard dry = 38.40

The following starting formula was provided to the computer:

| Raw Material | Weight |
| --- | --- |
| titanium dioxide | 248.55 |
| ferrite yellow dispersion | 35.74 |
| lampblack dispersion | 6.45 |
| red oxide dispersion | 1.19 |
| castor oil alkyd | 83.11 |

The computer was also provided with a tolerance value ($\Delta E$) of 1.5.

The paint formula was prepared, thoroughly mixed and color measurements were made by the spectrophotometer as outlined below:

| Wavelength | Reflectance |
| --- | --- |
| 400 | 20.57 |
| 420 | 29.38 |
| 440 | 33.64 |
| 460 | 36.23 |
| 480 | 37.34 |
| 500 | 39.22 |
| 520 | 42.91 |
| 540 | 45.49 |
| 560 | 47.36 |
| 580 | 48.03 |
| 600 | 48.03 |
| 620 | 47.72 |
| 640 | 47.19 |
| 660 | 46.82 |
| 680 | 46.27 |
| 700 | 46.04 |

X, Y and Z values of the wet paint being manufactured were calculated from that spectral curve to be X wet=43.92, Y wet=45.51, Z wet=41.19.

To calculate the theoretical dry X, Y and Z readings, the wet batch readings were divided by their corresponding correction factors to provide the following calculated dry readings:

$X_{(theoretical\ dry)} = 41.29$
$Y_{(theoretical\ dry)} = 42.83$
$Z_{(theoretical\ dry)} = 41.09$ These values were input into the computer and the computer calculated a $\Delta E$ of 6.09 which was in excess of the allowed tolerance levels. The computer then calculated the following recommended colorant additions:

| Colorant | Pounds Colorant |
| --- | --- |
| ferrite yellow dispersion | 1.381 |
| red oxide dispersion | 1.294 |
| lampblack dispersion | 0.099 |

The shading colorants were thoroughly mixed with the batch and X, Y and Z values of the wet paint being manufactured were generated based upon the spectral curve measured by the spectrophotometer. The determined X, Y and Z values of the wet paint were: X wet=42.90, Y wet=44.10, Z wet=39.86. These values were divided by the corresponding correction factors to provide the theoretical dry X, Y and Z readings as follows:

$X_{(theoretical\ dry)} = 40.32$
$Y_{(theoretical\ dry)} = 41.50$
$Z_{(theoretical\ dry)} = 39.77$ These theoretical dry values were input into the computer and the computer calculated a $\Delta E$ of 2.87 which was still outside of the allowed tolerance. The computer then calculated a second required colorant addition as follows:

| Colorant | Pounds Colorant |
| --- | --- |
| ferrite yellow dispersion | 3.045 |

This material was thoroughly mixed into the paint.

X, Y and Z values of the wet paint were again calculated based upon the spectrophotometer reading of the spectral curve. These wet values were as follows:

X wet=43.05
Y wet=44.31
Z wet=38.97

These readings were divided by the correction factors to provide the theoretical dry X, Y and Z readings as follows:

$X_{(theoretical\ dry)} = 40.47$
$Y_{(theoretical\ dry)} = 41.70$
$Z_{(theoretical\ dry)} = 38.88$ These theoretical dry values were input into the computer and the batch was predicted to be within tolerance levels.

At this point a sample panel was prepared from the wet batch and allowed to dry and was found to be within tolerance.

While this invention has been described by the specific example, it is obvious that other variations and modifications may be made without departing from the spirit and scope of the invention as set forth in the appended claims.

THE INVENTION CLAIMED IS:

1. In a process for the manufacture of paint to match the color of a standard paint within a specified color tolerance wherein the process involves the use of a spectrophotometer or a colorimeter and comprises:
   (a) mixing in a vessel the components of a paint, said components comprising a liquid binder for the paint, solvent for the paint, and colorants for the paint; and
   (b) shading the paint during its manufacture by the addition of additional colorants in the form of dispersions or solutions to match the color of the specified standard paint within the given color tolerance, the improvement which comprises utilizing as the shading procedure a process which comprises:
(1) determining correction factors describing the relationship between the X, Y and Z tristimulus readings of wet paints and the corresponding X, Y and Z tristimulus values of dry paints prepared from said wet paints; and
(2) measuring and determining by the spectrophotometer or colorimeter the X, Y and Z values of the wet paint being manufactured;
(3) calculating the theoretical X, Y and Z values of a dry paint sample of the paint being manufactured according to the formulas:

$$X_{(theoretical\ dry)} = \frac{X(\text{wet paint being manufactured})}{X\ \text{correction factor}}$$

$$Y_{(theoretical\ dry)} = \frac{Y(\text{wet paint being manufactured})}{Y\ \text{correction factor}}$$

$$Z_{(theoretical\ dry)} = \frac{Z(\text{wet paint being manufactured})}{Z\ \text{correction factor}}$$

and
(4) comparing the theoretical X, Y and Z dry values of the paint being manufactured to the X, Y and Z values of the standard dry paint and calculating the quantities of components to be added to the paint to bring the paint within the required color tolerance; and
(5) adding to the paint being manufactured the quantities of components calculated in step (4); and
(6) repeating steps (2) through (5) at least once in the event the paint is not within the specified color tolerance until the paint being manufactured is within said color tolerance.

2. In a process for the manufacture of paint to match the color of a standard paint within a specified color tolerance wherein the process involves the use of a spectrophotometer or a colorimeter and a computer and comprises:
(a) mixing in a vessel the components of a paint, said components comprising a liquid binder for the paint, solvent for the paint, and colorants for the paint; and
(b) shading the paint during its manufacture by the addition of additional colorants in the form of dispersions or solutions to match the color of the specified standard paint within the given color tolerance, the improvement which comprises utilizing as the shading procedure a process which comprises:
(1) providing the computer with
  (a) formula of the paint;
  (b) X, Y and Z tristimulus values of a standard dry paint;
  (c) correction factors describing the relationship between the X, Y and Z tristimulus readings of wet paints and the corresponding X, Y and Z tristimulus values of dry paints prepared from said wet paints; and
  (d) color tolerance value for the paint being manufactured;
(2) measuring and determining by the spectrophotometer or colorimeter the X, Y and Z values of the wet paint being manufactured;
(3) providing said measured X, Y and Z values of the wet paint being manufactured to the computer;
(4) calculating, by the computer, the theoretical X, Y and Z values of a dry paint sample of the paint being manufactured according to the formulas:

$$X_{(theoretical\ dry)} = \frac{X(\text{wet paint being manufactured})}{X\ \text{correction factor}}$$

$$Y_{(theoretical\ dry)} = \frac{Y(\text{wet paint being manufactured})}{Y\ \text{correction factor}}$$

$$Z_{(theoretical\ dry)} = \frac{Z(\text{wet paint being manufactured})}{Z\ \text{correction factor}}$$

(5) comparing by the computer the theoretical X, Y and Z dry values of the paint being manufactured to the X, Y and Z values of the standard dry paint and calculating the quantities of components to be added to the paint to bring the paint within the required color tolerance; and
(6) adding to the paint being manufactured the quantities of components calculated in step (5); and
(7) repeating steps (2) through (6) at least once in the event the paint is not within the color tolerance values until the paint being manufactured is within said color tolerance.

3. In a process for manufacturing a paint utilizing a computer electrically connected to a multiplicity of metering pumps, each pump being individually connected to a supply of a component used in the paint, said components used in the paint being liquid containing binder for the paint, solvent for the paint and colorant in the form of dispersions or solutions, a vessel having mixing means, a spectrophotometer or colorimeter having means to determine X, Y and Z tristimulus values of the wet paint in the vessel and being electrically connected to the computer, said process being controlled by the computer and comprising the following steps:
(1) providing the computer with
  (a) formula of the paint,
  (b) X, Y and Z tristimulus values of the standard dry paint,
  (c) correction factors describing the relationship between the X, Y and Z tristimulus values of wet paints and the corrsponding X, Y and Z tristimulus values of dry paints prepared from said wet paints; and
  (d) color tolerance value for the paint being manufactured;
(2) metering exact amounts of components of the paint into the mixing vessel by the metering pumps which are being controlled by the computer;
(3) mixing said components to form a wet paint;
(4) measuring and determining by the spectrophotometer or colorimeter the X, Y and Z values of the wet paint being manufactured;
(5) providing said measured X, Y and Z values of the wet paint being manufactured to the computer;
(6) calculating by the computer the theoretical X, Y and Z values of a dry paint sample prepared from the paint components according to the formulas:

$$X_{(theoretical\ dry)} = \frac{X(\text{wet paint being manufactured})}{X \text{ correction factor}}$$

$$Y_{(theoretical\ dry)} = \frac{Y(\text{wet paint being manufactured})}{Y \text{ correction factor}}$$

$$Z_{(theoretical\ dry)} = \frac{Z(\text{wet paint being manufactured})}{Z \text{ correction factor}}$$

(7) comparing by the computer the theoretical X, Y, Z dry values of paint being manufactured to the X, Y and Z values of the standard dry paint and calculating the quantities of components to be added to the paint to bring the paint within the color tolerance; and (8) adding to the paint being manufactured the quantities of components calculated in step (7); and (9) repeating steps (2) - (8) at least once in the event the paint is not within the color tolerance value for the paint to bring the paint within said color tolerance.

* * * * *